United States Patent
Aniulis

(10) Patent No.: US 12,090,526 B2
(45) Date of Patent: Sep. 17, 2024

(54) STABLE VORTEX FUME HOOD CONTROL DEVICE

(71) Applicant: Johnson Controls Tyco IP Holdings LLP, Milwaukee, WI (US)

(72) Inventor: Aurimas Aniulis, Atlanta, GA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 193 days.

(21) Appl. No.: 17/716,149

(22) Filed: Apr. 8, 2022

(65) Prior Publication Data

US 2023/0278082 A1     Sep. 7, 2023

Related U.S. Application Data

(63) Continuation-in-part of application No. 17/684,246, filed on Mar. 1, 2022.

(51) Int. Cl.
| | |
|---|---|
| *B08B 15/02* | (2006.01) |
| *F24F 11/74* | (2018.01) |
| *G05D 7/06* | (2006.01) |

(52) U.S. Cl.
CPC .......... *B08B 15/023* (2013.01); *F24F 11/74* (2018.01); *G05D 7/0635* (2013.01)

(58) Field of Classification Search
None
See application file for complete search history.

(56) References Cited

U.S. PATENT DOCUMENTS

| | | | |
|---|---|---|---|
| 4,177,718 A | 12/1979 | Grow | |
| 4,377,969 A | 3/1983 | Nelson | |
| 4,706,553 A * | 11/1987 | Sharp | B08B 15/023 454/61 |
| 4,741,257 A * | 5/1988 | Wiggin | B08B 15/023 454/59 |
| 4,773,311 A * | 9/1988 | Sharp | B08B 15/023 454/56 |
| 4,934,256 A | 6/1990 | Moss et al. | |
| 5,115,728 A * | 5/1992 | Ahmed | G05D 16/208 454/340 |
| 5,205,783 A | 4/1993 | Dieckert et al. | |
| 5,385,505 A * | 1/1995 | Sharp | G05D 16/2053 454/238 |

(Continued)

FOREIGN PATENT DOCUMENTS

| | | |
|---|---|---|
| DE | 69814036 T2 | 4/2004 |
| EP | 0 954 390 B1 | 11/1999 |
| JP | 2007-061750 A | 3/2007 |

*Primary Examiner* — Joseph A Dillon, Jr.

(74) *Attorney, Agent, or Firm* — Foley & Lardner LLP

(57) ABSTRACT

A fume hood control system includes a fume hood. The fume hood includes a sash, an exhaust valve, and a hood enclosure positioned within an environment. The exhaust valve is transitionable between a number of positions. The fume hood control system includes a controller. The controller is configured to determine a differential pressure measurement, determine a current position of the exhaust valve, determine a position of the sash, and control the operation of the exhaust valve to selectively transition between the current position of the exhaust valve and an updated position of the exhaust valve based on at least one of: (1) a difference between a setpoint differential pressure value and the differential pressure measurement and (2) the position of the sash.

20 Claims, 11 Drawing Sheets

(56) References Cited

U.S. PATENT DOCUMENTS

| | | | |
|---|---|---|---|
| 5,415,583 A * | 5/1995 | Brandt, Jr. | B08B 15/023 454/61 |
| 5,545,086 A * | 8/1996 | Sharp | F24F 11/0001 454/238 |
| 5,810,657 A * | 9/1998 | Pariseau | F24F 11/64 454/67 |
| 5,946,221 A * | 8/1999 | Fish, Jr. | B08B 15/023 454/239 |
| 5,988,860 A * | 11/1999 | Hefferen | B08B 15/023 700/282 |
| 6,154,686 A | 11/2000 | Hefferen et al. | |
| 6,272,399 B1 * | 8/2001 | Fish, Jr. | F24F 11/74 454/239 |
| 6,692,346 B2 | 2/2004 | Bastian et al. | |
| 6,914,532 B2 | 7/2005 | Crooks et al. | |
| 6,923,715 B2 * | 8/2005 | Kreuzer | B08B 15/023 126/299 F |
| 7,470,176 B2 | 12/2008 | Morris et al. | |
| 9,541,378 B2 | 1/2017 | Charles et al. | |
| 9,945,571 B2 * | 4/2018 | Omura | F24F 11/74 |
| 10,109,071 B2 | 10/2018 | Charles | |
| RE48,081 E | 7/2020 | Donohue | |
| 10,755,555 B2 | 8/2020 | Norton et al. | |
| 10,917,740 B1 | 2/2021 | Scott et al. | |
| 11,801,538 B2 * | 10/2023 | Desrochers | F24F 3/163 |
| 2004/0014417 A1 * | 1/2004 | Katz | F24F 11/0001 454/62 |
| 2013/0233411 A1 | 9/2013 | Donohue | |
| 2014/0094106 A1 | 4/2014 | McIlhany | |
| 2014/0120819 A1 | 5/2014 | Stakutis et al. | |
| 2021/0291242 A1 * | 9/2021 | Desrochers | B08B 15/023 |

* cited by examiner

STABLE VORTEX FUME HOOD CONTROL DEVICE

CROSS-REFERENCE TO RELATED PATENT APPLICATIONS

This application is a continuation-in-part application of U.S. patent application Ser. No. 17/684,246, filed Mar. 1, 2022, which is incorporated herein by reference in its entirety.

BACKGROUND

The present disclosure relates generally to fume hoods. More specifically, the present disclosure relates to controlling the operation of fume hoods.

A fume hood, also known as a fume cupboard, is a working environment with localized ventilation that is frequently used in workplaces such as laboratories. The purpose of a fume hood is to contain (or minimize the leakage of) gases, vapors, and other airborne contaminants from the interior of the fume hood into the immediate surrounding environment. A user, such as a laboratory technician, may work with potentially harmful biological or chemical materials that are placed inside a fume hood, and the immediate surrounding environment of the fume hood may include the user's breathing area. A ventilation system may draw air from the technician's surrounding environment, such as a laboratory, into a fume hood, and vent the gases into another location.

Some designs of fume hoods feature a sash or sash window in the front opening of the fume hood. The sash can be raised to allow easier access to the materials and laboratory equipment contained within the fume hood. The sash can also be lowered when access is not required to further minimize the potential for materials to leak into the surrounding environment. Typically, the sash does not close fully, but instead maintains a narrow opening. This enables the ventilation system to continue to receive air from the environment.

Some designs of fume hoods feature one or more baffles within the fume hood to direct airflow through the fume hood.

SUMMARY

In at least one embodiment, a fume hood control system for a fume hood is provided. The fume hood includes a sash and a hood enclosure positioned within an environment. The hood enclosure includes a number of sidewalls forming a work chamber. The hood enclosure further includes a first aperture configured to permit an airflow between the environment and the work chamber, a second aperture configured to permit the airflow between the work chamber and an outlet, and an exhaust valve disposed in the outlet. The exhaust valve is transitionable between a number of positions. The sash is configured to at least partially cover the first aperture. The fume hood control system includes a controller. The controller is configured to determine a differential pressure measurement, determine a current position of the exhaust valve, determine a position of the sash, and control the operation of the exhaust valve to selectively transition between the current position of the exhaust valve and an updated position of the exhaust valve based on at least one of: (1) a difference between a setpoint differential pressure value and the differential pressure measurement and/or (2) the position of the sash.

In at least one embodiment, a method of controlling an exhaust valve of a fume hood is provided. The method includes determining, via a controller, a current position of an exhaust valve. The exhaust valve is transitionable between a number of positions. The method further includes controlling, via the controller, the exhaust valve to transition between the current position of the exhaust valve and an updated position of the exhaust valve based on a position of a sash when a position sensor determines that the position of the sash is changing. The method further includes controlling, via the controller, the exhaust valve to transition between the current position of the exhaust valve and the updated position of the exhaust valve based on a difference between a differential pressure measurement and a setpoint differential pressure value when the position sensor determines that the position of the sash is not changing. The differential pressure measurement is based on a first pressure measurement of an air pressure within the fume hood and a second pressure measurement of an air pressure outside the fume hood.

In at least one embodiment, a feedback loop for controlling a position of an exhaust valve in a fume hood system is provided. The feedback loop includes a controller, a differential pressure sensor, and an actuator. The controller includes one or more processors and a memory. The one or more processors are configured to receive, via the differential pressure sensor, a differential pressure measurement. The differential pressure measurement is based on a difference between a first air pressure outside the fume hood and a second air pressure within the fume hood. The one or more processors are further configured to receive, via a management device, a setpoint differential pressure. The one or more processors are further configured to receive, via a position sensor, a determination as to whether a sash in the fume hood system is moving. The one or more processors are further configured to control the actuator in response a determination that the sash is not moving. The actuator is operable to transition the exhaust valve between a current position and an updated position. Controlling the actuator is based on a difference between the setpoint differential pressure and the measured differential pressure.

In at least one embodiment, a controller for controlling a position of an exhaust valve in a fume hood system is provided. The fume hood system includes a pressure sensor and an actuator. The controller includes one or more processors and a memory. The one or more processors are configured to receive, via the pressure sensor, a pressure measurement. The pressure measurement is based on a first air pressure outside the fume hood and a second air pressure within the fume hood. The one or more processors are further configured to receive, via a management device, a setpoint pressure. The one or more processors are further configured to receive, via a position sensor, a determination as to whether a sash in the fume hood system is moving. The one or more processors are further configured to control the actuator in response a determination that the sash is not moving. The actuator is operable to transition the exhaust valve between a current position and an updated position. Controlling the actuator is based on a difference between the setpoint pressure and the pressure measurement.

This summary is illustrative only and should not be regarded as limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
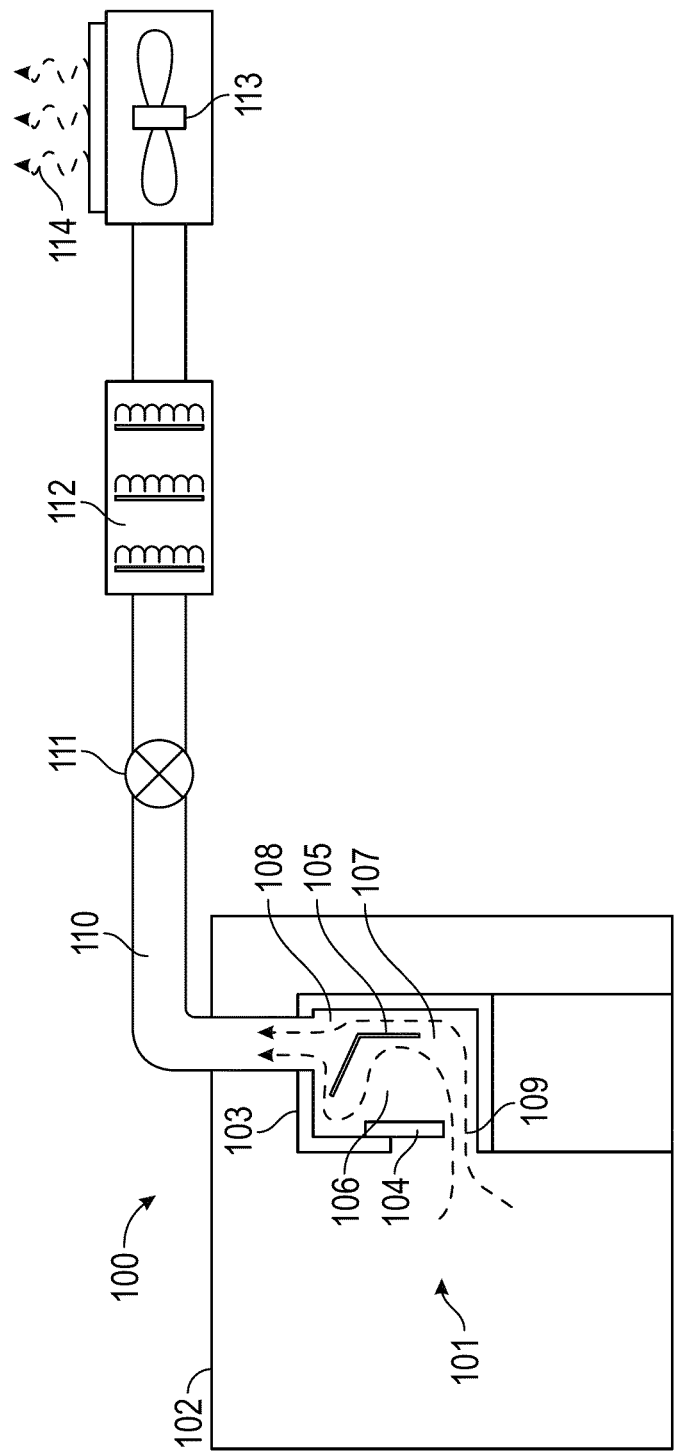
FIG. 1 is a block diagram showing a ventilation system for a fume hood, according to one embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates to fume hoods, including, but not limited to, dynamically maintaining a stable vortex formed by airflow within a fume hood. In order to contain airborne contaminants or other substances within the interior of the fume hood, many systems use a ventilation system to draw air from a surrounding environment of the fume hood, through an interior of the fume hood, and to another location. In this way, contaminants produced within the fume hood are directed by an airflow within the fume hood to remain in the interior of the fume hood and ultimately be drawn out of the interior of the fume hood into the other location.

In a constant air volume (CAV) fume hood, the volume of air that is drawn through the fume hood remains constant. When the sash is lowered, the size of the opening into the fume hood (e.g., the sash opening) is reduced. If the volumetric flow rate of air remains constant, then the velocity of the air must increase as the size of the opening reduces. This increase in air velocity is often not necessary to maintain the efficacy of the fume hood, and so may lead to inefficiency and wasted energy. In some systems using a variable air volume (VAV) fume hood, the position of the sash is monitored, and the volumetric flow rate of air being drawn through the fume hood is adjusted in response. The volumetric flow rate of air being drawn through the fume hood may be adjusted by a variable exhaust valve, while fans drawing air through the fume hood remain operating at a constant speed. When the sash is lowered, the exhaust valve may partially close to lower the volumetric flow rate of air being drawn through the fume hood. This maintains the velocity of air at the sash opening and increases efficiency.

Previously, one of the measures used to verify operations within the fume hood was the feet per minute (FPM or "face velocity") of air moving through the sash opening where the where the user interacts with the fume hood and performs various operations within the fume hood. It has since been documented in the American Society of Heating, Refrigerating and Air-Conditioning Engineers (ASHRAE) code that face velocity is no longer a measure of fume hood safety. Rather, containment of air particles within the fume hood has been documented as the proper measure for verifying operations within the fume hood. Accordingly, many systems verify containment via face velocity. For example, many systems verify containment by measuring a face velocity of 100 FPM. However, face velocity in general does not account for dynamic changes occurring within the fume hood. For instance, the activation of a burner (e.g., a "Bunsen Burner") may provide a significant change in pressure within the fume hood that jeopardizes the containment of air particles, even though the measured FPM remains at 100. Further, the placement of various equipment in the fume hood may invoke turbulence in the air moving through the fume hood, thereby disrupting containment while, again, the measured FPM remains at 100. Therefore, some embodiments provide a system that actively measures changing conditions within the fume hood and dynamically adjusts the airflow through the fume hood such that containment is properly maintained.

Various embodiment disclosed herein relate to a mechanism that monitors conditions pertaining to maintaining a stable vortex of air and dynamically controls the position of one or more aerodynamic baffles in a fume hood, thereby maintaining the stable vortex of air inside the working area of the fume hood which continuously absorbs and ejects vapors while simultaneously pulling in fresh air. The one or more baffles may be controlled to change position in order to respond to changes in conditions regarding the fume food, such as raising or lowering the sash. The monitoring and dynamic control of the stable vortex within the fume hood is a significantly more effective method to ensure containment in fume hoods as opposed to face velocity. Moreover, maintaining a stable vortex within the fume hood may achieve containment without the need for a face velocity of 100 FPM, thereby allowing for reductions in energy consumption and improved efficiency. In some embodiments disclosed herein, the dynamic control system further leverages control over an exhaust valve to maintain the stable vortex of air.

Various embodiments disclosed herein relate to a mechanism for dynamically controlling the position of one or more baffles in a fume hood, thereby maintaining a stable vortex optimized for containment.

Various embodiment disclosed herein relate to a mechanism that monitors conditions pertaining to maintaining a "negative pressure" within the fume hood and dynamically controls the draw of air through the fume hood, thereby maintaining the negative pressure within the fume hood. As used herein, "negative pressure" within the fume hood indicates that the pressure within the fume hood is less than a reference pressure (e.g., the air pressure of the environment surrounding the fume hood, the air pressure within a room surrounding the fume hood, etc.). For example, various actuators described herein may draw air out of the fume hood, resulting in an air pressure within the fume hood that may be different than the air pressure outside the fume hood. In some embodiments, negative pressure, or a particular value of negative pressure, may maintain containment of air particles. In other embodiments, negative pressure, or a particular value of negative pressure, may maintain a stable vortex optimized for containment of air particles.

Turning now to FIG. 1, a block diagram of a ventilation system 100 is shown, according to one embodiment. The ventilation system 100 is provided within a room 102 made up of a plurality of walls (e.g. a laboratory), and includes a fume hood 101, a ductwork 110 (e.g. an air duct, conduit, vent, etc.), an exhaust valve 111, a filter 112, a fan 113, and a different location 114 (e.g. the roof of a building, air duct system, etc.). The fume hood 101 is positioned within the room 102 and includes an upper housing 103 (e.g. a first or upper unit or enclosure, a work chamber, etc.), a sash 104 (e.g. a panel member, window, sliding door, etc.), an opening 109, an upper chamber region 108, and a baffle assembly (e.g., one or more baffles) 105. The fan 113 creates a negative pressure in the ductwork 110, which draws air out of the upper chamber region 108. This in turn creates negative pressure in the upper chamber region 108 and causes air to be drawn into the fume hood 101 through the opening 109, into a lower chamber region 107, and to the upper chamber region 108, either directly (e.g., through a narrow region behind the baffle assembly 105) or through a main chamber region 106 (e.g., in front of the baffle assembly 105). Air flowing through the opening 109, the lower chamber region 107, the main chamber region 106, and the upper chamber region 108 may be directed by the baffle assembly 105. As described in greater detail below with reference to FIGS. 3 and 4, the air, as directed by the baffle assembly 105, may form a vortex in the main chamber region 106. The sash 109 at least partially covers a front aperture of the upper housing 103, thus forming the opening 109. The size of the opening 109 is determined by the raising and lowering of the sash 104. The air that passes through the ductwork 110 and the exhaust valve 111 may pass through one or more filters, such as the filter 112, before being vented to the different location 114. The exhaust valve 111 may be coupled to an exhaust valve actuator 550, as described in greater detail below with reference to FIGS. 5A and 5B. The fume hood 101 may be, or include any of the features of, any of the fume hoods disclosed herein.

Figure 2:
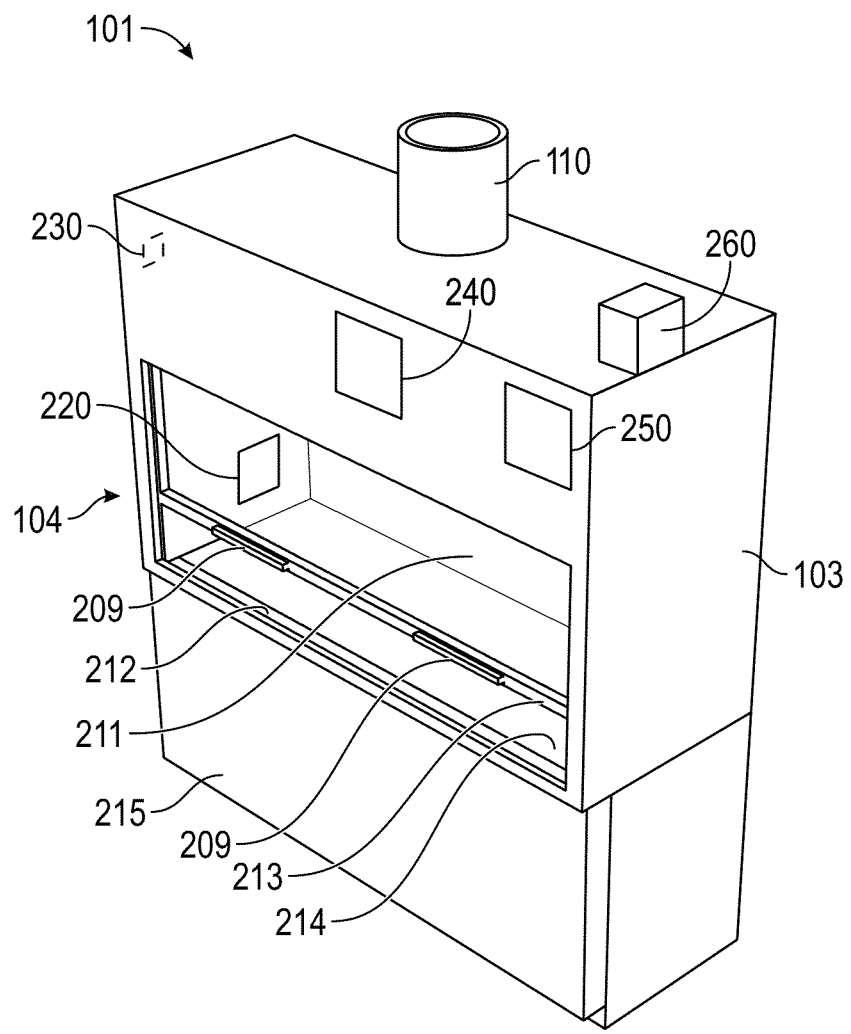
FIG. 2 is a front perspective view of a fume hood, according to one embodiment.

Referring now to FIG. 2 with additional reference to FIG. 1, the fume hood 101 depicted in FIG. 1 is shown in greater detail, according to one embodiment. The fume hood 101 includes the upper housing 103, a work surface 214, the sash 104, and a lower unit 215 (e.g. a second or lower unit or enclosure, etc.). The upper housing 103 is coupled to the ductwork 110 through which air may travel (e.g., be drawn up or down) to or from within the fume hood 101. The lower unit 215 may include storage areas, such as cupboards or drawers. The sash 104 includes handles 209, a frame 213, and a glass window 211. According to various embodiments, the sash may take any appropriate size and/or shape and be made of any appropriate material for covering an opening of a fume hood. During use, a person may raise the sash 104 in order to gain access to the work surface 214, onto which the person may place various chemical and/or biological materials, according to one embodiment. When not in use, a person may lower the sash 104, but still leave a narrow opening 212, so that the ductwork 110 can continue to operate. In a system using a variable air volume (VAV) fume hood, the position of the sash is monitored, and the volumetric flow rate of air being drawn through the fume hood is adjusted in response. The volumetric flow rate of air being drawn through the fume hood may be adjusted by a variable exhaust valve, while fans drawing air through the fume hood remain operating at a constant speed. When the sash is lowered, the exhaust valve may partially close to lower the volumetric flow rate of air being drawn through the fume hood. This maintains the velocity of air at the sash opening and increases efficiency in some embodiments.

In some embodiments, the fume hood 101 further includes a controller 260 coupled to the upper housing 103 and a first pressure sensor 220 coupled to the upper housing 103. The first (e.g., interior) pressure sensor 220 may measure an air pressure within the upper housing 103. For example, the first pressure sensor 220 may measure the air pressure in the main chamber region 106 described above with reference to FIG. 1. The fume hood 101 further includes a second (e.g., exterior, reference, etc.) pressure sensor 250 coupled to the upper housing 103. The second pressure sensor 250 measures an air pressure outside the upper housing 103 in some embodiments. For example, the second pressure sensor 250 may measure the air pressure in the room 102. Accordingly, the first pressure sensor 220 and the second pressure sensor 250 may act together to measure the difference in air pressure between a region inside the upper housing 103 and a region outside the upper housing 103. In some embodiments, the first pressure sensor 220 and the second pressure sensor 250 operate in combination as a differential pressure sensor configured to measure the difference between the air pressure within the upper housing 103 and the air pressure in the room 102 (rather than two sensors providing measurements independently, as shown). The first pressure sensor 220 and the second pressure sensor 250 are each communicably coupled to the controller 260. The controller 260 may direct dynamic adjustments to one or more components of the fume hood 101 in order to maintain containment, as described in further detail below. In some embodiments, the fume hood 101 further includes a user display 240 coupled to the upper housing. The user display 240, as described in greater detail below, may provide the user with a status of the fume hood 101 or various warning messages regarding non-containment conditions. In some embodiments, the first pressure sensor 220 and the second pressure sensor 250 are a combined as a single differential pressure sensor with a port for the region inside the upper housing 103 and a port for the region outside the upper housing 103.

In some embodiments, the fume hood 101 further includes a sash position sensor 230. The sash position sensor 230 may measure the position of the sash 104. The sash position sensor 230 may be configured to sense condition data (e.g. position, movement, speed, etc.) associated with a sash and/or the surrounding environment, such as the sash 104 depicted in FIG. 1, and communicate the condition data of the sash 104 to the controller 260. In some embodiments, the sash position sensor 230 is an ultrasonic or laser sensor that detects proximity, a Bluetooth® low energy (BLE) sensor that detects proximity of a BLE tag, a mechanical sensor, or some other type of sensor that detects sash position.

In some embodiments, the controller 260 uses information provided by the sash position sensor 230 to determine the current position of the sash 104. This information is transmitted to a variable air volume (VAV) controller to adjust the flow rate in response to the position of the sash 104. In other embodiments, the controller 260 may use information provided by a VAV controller, or other sensors in the fume hood 101, to determine the position of the sash 104. In some embodiments, the controller 260 is configured to communicate using a wireless communication protocol, including but not limited to, Wi-Fi (e.g. 802.11x), Wi-Max, cellular (e.g. 3G, 4G, LTE, CDMA, etc.), LoRa, Zigbee, Zigbee Pro, Bluetooth, Bluetooth Low Energy (BLE), Near Field Communication (NFC), Z-Wave, 6LoWPAN, Thread, RFID, and other applicable wireless protocols In some embodiments, the handles 209 feature force switches that determine when a handle is being pulled upwards or pushed downwards. The state of these switches may indicate to the controller 260 if a person is attempting to raise or lower the sash 104, and be used as an alternative to, or in conjunction with the sash position sensor 230 to determine the position of the sash 104. The measured position of the sash 104 may be used to determine a size of the opening 109 described above with reference to FIG. 1.

Figure 3:
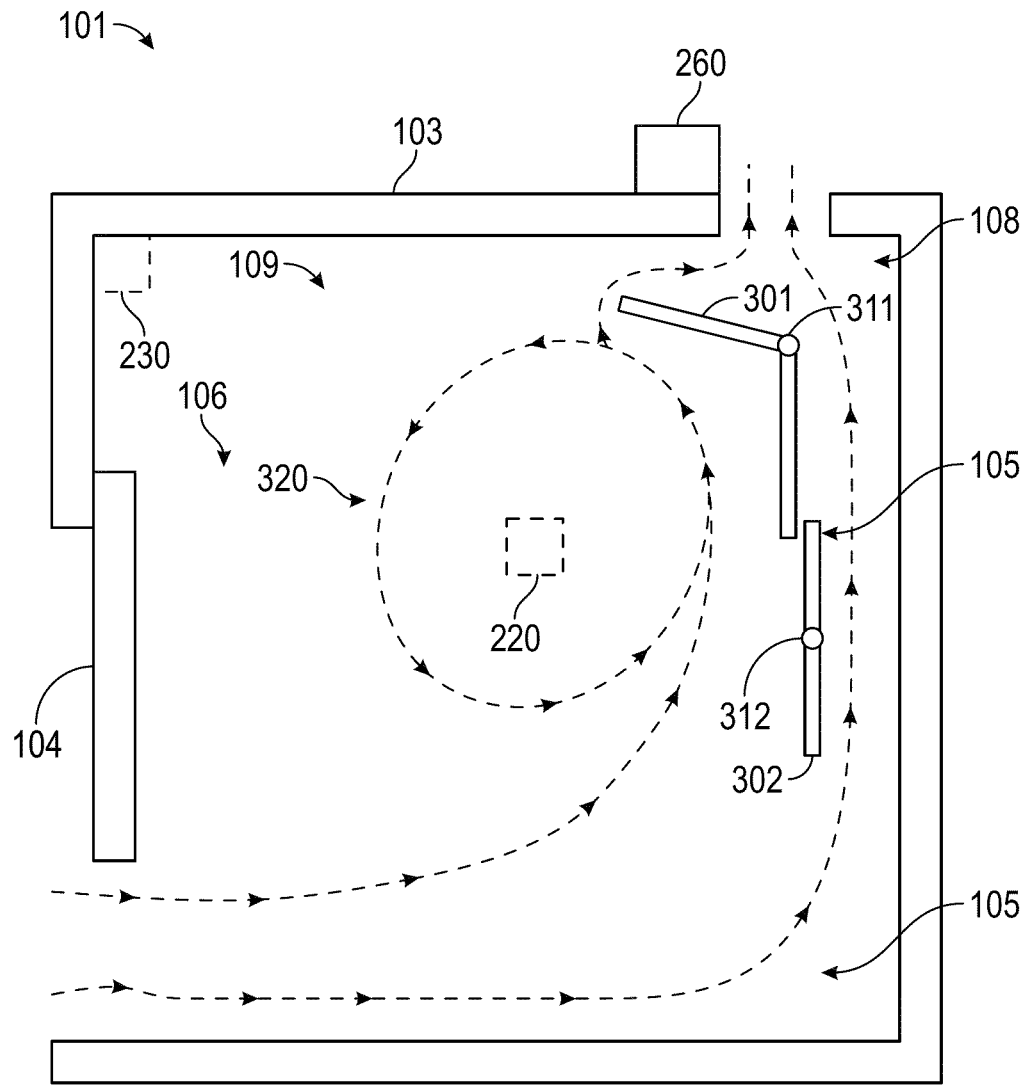
FIG. 3 is a side cross-sectional view of a fume hood showing an air path interacting with baffles, according to one embodiment.
Figure 4:
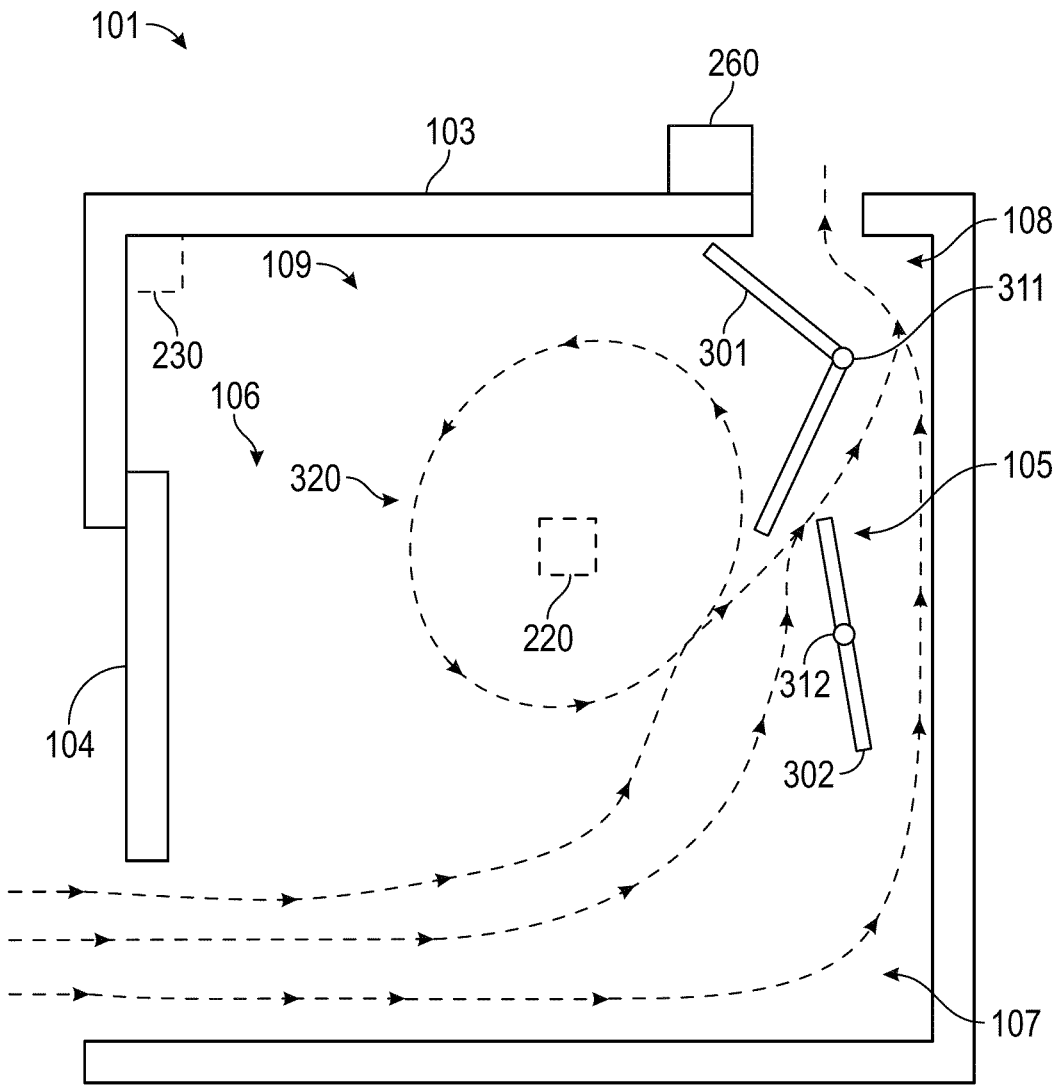
FIG. 4 is a side cross-sectional view of a fume hood showing an updated air path interacting with baffles in an updated position, according to one embodiment.

Referring now to FIG. 3, with additional reference to FIGS. 1 and 2, a cross-sectional view of the fume hood 101 is shown, according to one embodiment. As shown, the baffle assembly 105 includes a first baffle 301 and a second baffle 302. The first baffle 301 is coupled to a first actuator 311 and the second baffle 302 is coupled to a second actuator 312. The first actuator 311 is configured to rotate (e.g., move, translate, displace, etc.) the first baffle 301 and the second actuator 312 is configured to rotate the second baffle 312. As shown in FIG. 4, the first baffle 301 and second baffle 302 can thus be repositioned to affect the airflow through the fume hood 101.

As shown, air flowing through the fume hood 101 is distributed on a path that creates a vortex 320. As suggested above, the vortex 320 may be necessary for optimal conditions within the upper housing 103. Generally, the vortex 320 is shaped as a result of the interior shape of the upper housing 103 and the positions of the baffle assembly 105.

In some embodiments, the first pressure sensor 220 is located as shown, within the main chamber region 106. However, the first pressure sensor 220 may be located in any number of locations on and/or within the upper housing 103 to detect a pressure measurement within the work chamber, including, but not limited to, the lower chamber region 107, the main chamber region 106, and the upper chamber region 108.

Referring now to FIG. 4, with additional references to FIGS. 1-3, a cross sectional view of the fume hood 101 is shown, according to one embodiment. As shown, and compared to the baffle assembly depicted in FIG. 3, the baffle assembly 105 as depicted in FIG. 4 has been updated. Specifically, the first baffle 301 has been rotated by the actuator 311 about an axis formed by the actuator 311 and the second baffle 312 has been rotated by the second actuator 312 about an axis formed by the second actuator 312. Updates to the position of the baffle assembly 105 may be responsive to any number of changes to the conditions within the fume hood 101. As a first example, the position of the sash 104 may change. The sash 104 may be raised, resulting in the opening 109 depicted in FIG. 1; the sash may be lowered, resulting in the narrow opening 212 depicted in FIG. 2; or the sash 104 may be positioned at any translational point with respect to the fume hood 101 that alters, at least temporarily, the amount of air traveling into the fume hood 104. Although not shown, though suggested above, the sash 104 may be configured to articulate an opening in the fume hood 101 in any number of manners aside from vertical translation including, but not limited to, horizontal translation, the opening of doors on the sash 104, etc. As a second example, cross drafts arriving from the room 102, may change the conditions within the fume hood 101. As a third example, various work procedures may change the conditions within the fume hood 101 (e.g., a user standing too close to the opening 109). As a fourth example, internal obstructions, such as various work equipment, may change the conditions within the fume hood 101. As a fifth example, chemicals and/or vapors produced by the work procedures may change the conditions within the fume hood 101. As a sixth example, in a system where the exhaust valve 111 is operated in immediate response to a changing position of the sash 104, as described in greater detail below with reference to FIG. 5B, updates to the amount of air being drawn out of the fume hood 101 may not occur quickly enough in response to a change in position of the sash 104 to maintain the conditions within the fume hood 101, and therefore an updated position of the baffle assembly 105 may be required to ensure appropriate operation. Accordingly, any number of instances could cause dynamic changes within the fume hood 101. Therefore, the dynamic system of the present disclosure may offer an optimized solution to reacting to such changed conditions in order to ensure a working environment.

In some embodiments, the first actuator 301 and/or the second actuator 302 are stepper motors. In other embodiments, the first actuator 301 and the second actuator 302 are another type of motor. The first actuator 301 and/or the second actuator 302 may use electricity supplied by mains power. The mains power may be converted through use of a transformer and/or AC to DC converter to achieve the electrical supply that the first actuator 301 and/or the second actuator 302 require. The first actuator 301 and/or the second actuator 302 may be powered by a battery, or a supplemental battery may be used in addition to mains power. Where either or both of the first actuator 301 and the second actuator 302 are powered by a battery, the first actuator 301 and/or the second actuator 302 are able to control the rotational position the first baffle 301 and/or the second baffle 312 of a sash in the event of a power failure (the mains power, for example). Where the supplemental battery is rechargeable, it may be recharged by mains power.

Figure 5A:
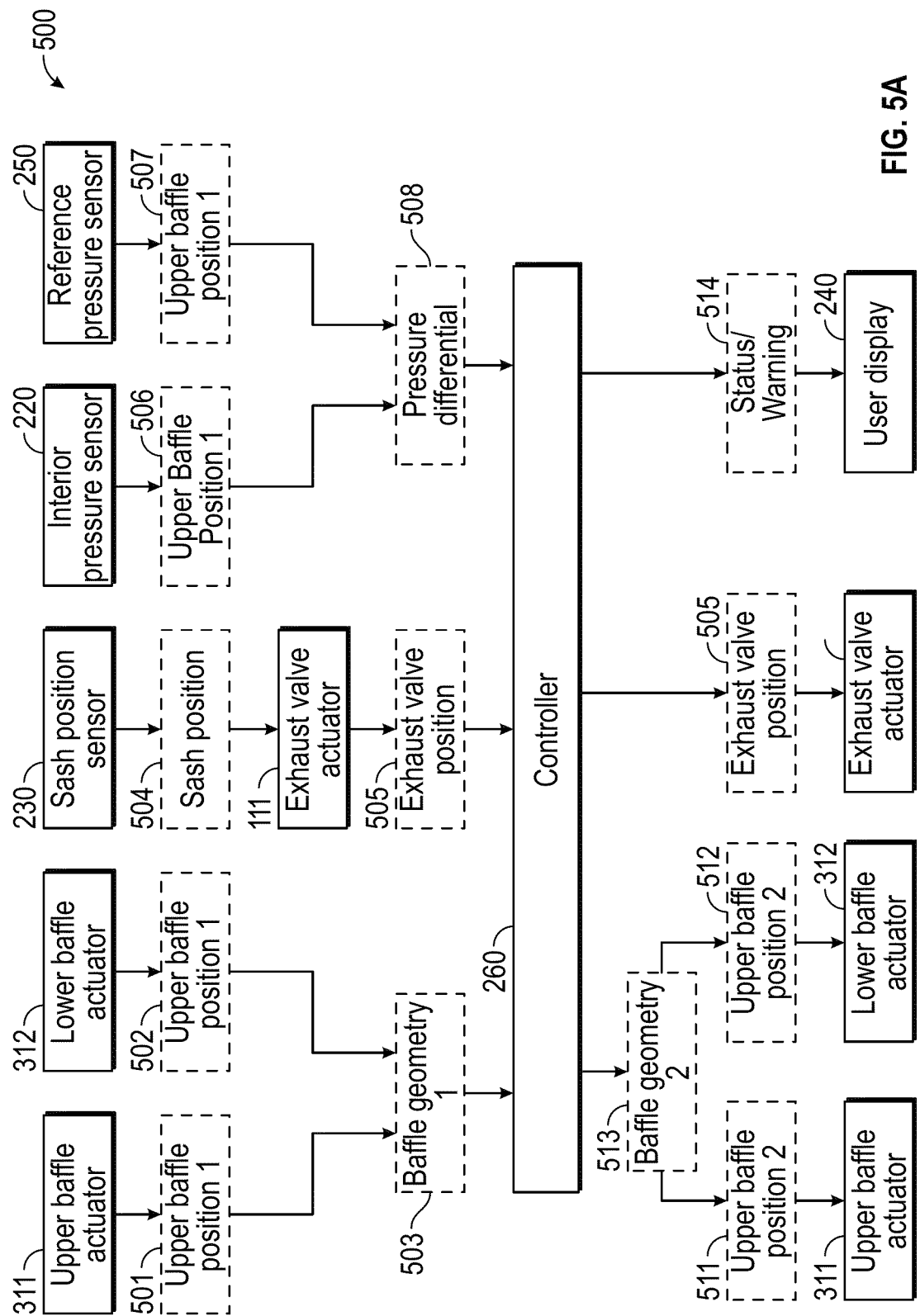
FIG. 5A is a flow diagram showing a controller controlling the position of baffles of a fume hood and a display device, according to one embodiment.
Figure 5B:
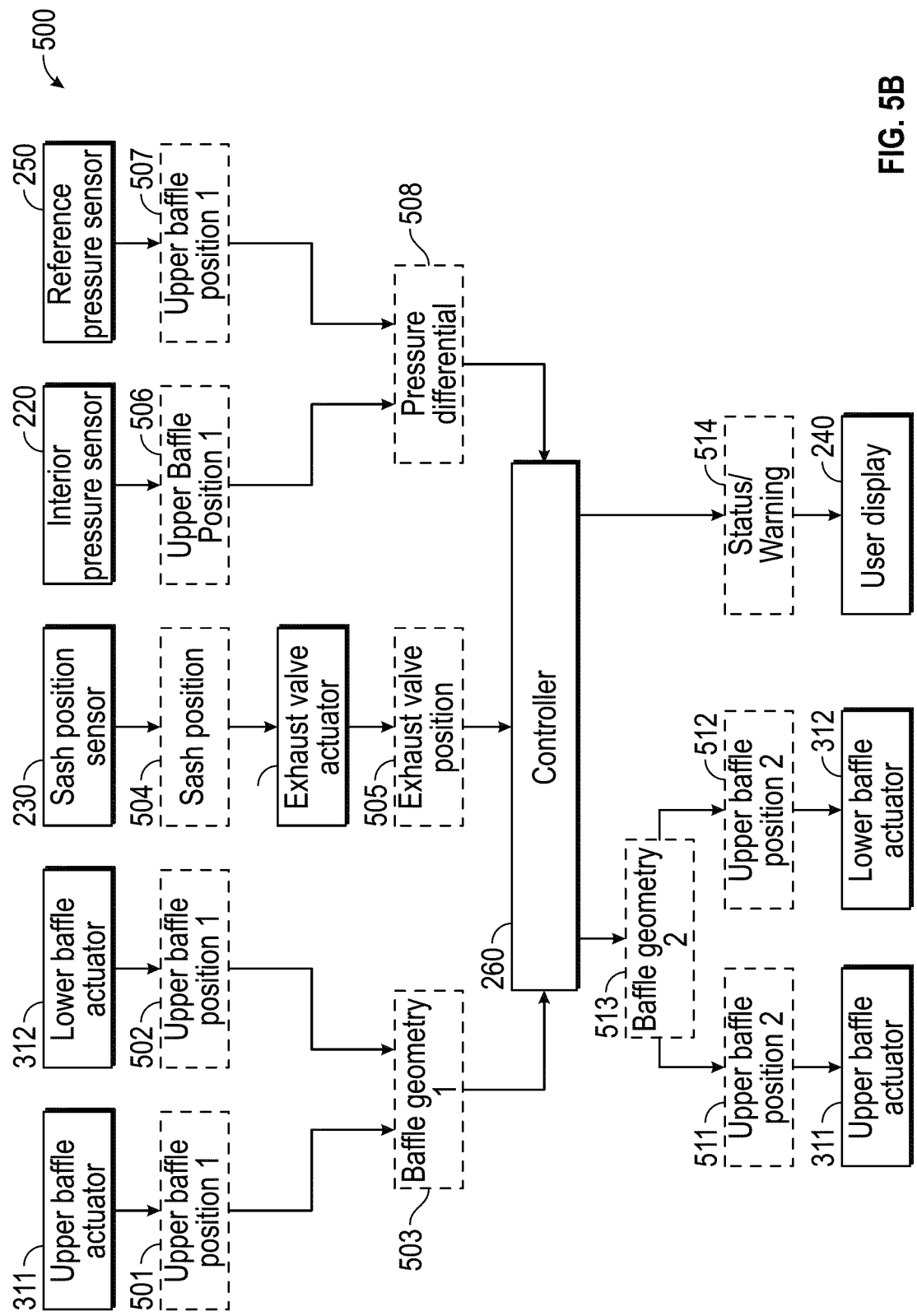
FIG. 5B is a flow diagram showing a controller controlling the position of baffles of a fume hood, a display device, and an exhaust valve, according to one embodiment.

Referring now to FIGS. 5A and 5B, with additional reference to FIGS. 1, 2, and 4, a flow 500 for controlling the position of the baffle assembly 105 is shown, according to some embodiments. FIG. 5A depicts the controller 260 interpreting a current (e.g., previous, original, measured) baffle geometry 503, a sash position 504, and a pressure differential 508 to determine an adjusted (e.g., updated, optimized, changed, re-articulated, etc.) baffle geometry 513, an exhaust valve position 505, and a status and/or warning message 514. As illustrated in FIGS. 3 and 4, the baffle geometry 503 may include an upper baffle position (e.g., a rotational position) 511 and a lower baffle position 512, which are manipulated to direct the airflow through the upper housing 103. The exhaust valve position 505, as described in greater detail below with reference to FIG. 5B, may be provided to the exhaust valve actuator 111 to articulate an orientation of the exhaust valve, thereby determining the volumetric flow of air through the upper housing 103. FIG. 5B depicts the controller 260 interpreting the current baffle geometry 503, the exhaust valve position 505

(determined independently of the controller 260's downstream determinations in the flow 500, in this embodiment) and the pressure differential 508 to determine the adjusted baffle geometry 513 and the status/warning message 514.

Referring specifically to FIG. 5A, the first baffle actuator 311 measures an upper baffle position 501, according to one embodiment. The upper baffle position 501 may be measured as a rotational position of the upper baffle 301. In some embodiments, the first baffle actuator 311 includes a motion sensing roller that uses an optical, mechanical, or electrical system to detect rotation of the upper baffle 301. The motion sensing roller may measure the angle and/or frequency of rotations, which may be used to determine the rotational movement (e.g., a starting rotational position, an ending rotational position, a rotational speed, etc.) of the upper baffle 301. In other embodiments, the first actuator 311 may be a stepper motor, as suggested above with reference to FIG. 4, and include an electrical sensor. Rotation of the first baffle 301 results in rotation a motor core included in the first baffle actuator 311. The rotation of the motor core induces an electrical current in one or more electrical coils included in the first baffle actuator 311. The electrical sensor detects the induced electrical current in the one or more electrical coils and provides a corresponding signal to indicate a rotational position of the upper baffle 301. A frequency of pulses of the induced current may also be used to indicate a speed at which the upper baffle 301 is rotating. The second actuator 312 may measure a lower baffle position 502 in a similar manner as the first baffle actuator 311 measures the upper baffle position 501. The upper baffle position 501 and the lower baffle position 502 are communicated, via the first baffle actuator 311 and the second actuator 312, to the controller 260. Together, the upper baffle position 501 and the lower baffle position 502 may form a current baffle geometry 503 describing a general geometry of the baffle assembly 105. Of course, the current upper baffle position 501 and the current lower baffle position 502 may simply be determined separately by the controller 260 without a determination of a generalized baffled geometry.

In some embodiments, the sash position sensor 230 measures a sash position 504, as described above with reference to FIG. 2. The sash position sensor 230 may communicate the measured sash position 504 to the controller 260.

In some embodiments, the first pressure sensor 220 determines the air pressure within the upper housing 103 and provides an interior pressure measurement 506. Similarly, the second pressure sensor 250 determines the air pressure in the room 102 and provides an exterior pressure measurement 507. A pressure differential 508 may be determined by comparing the interior pressure measurement 506 and the exterior pressure measurement 507. Thus, the pressure differential 508 may be determined by, or provided to, the controller 260. In other embodiments, and as described above with reference to FIG. 2, a single differential pressure sensor may provide the controller 260 with a single differential pressure measurement that indicates the pressure differential 508.

In some embodiments, the controller 260 determines the adjusted baffle geometry 513 by receiving and interpreting the upper baffle position 501 and the lower baffle position 502. From the current baffle geometry 503, the controller 260 may determine a number of aerodynamic properties regarding airflow through the upper housing 103. For example, the controller 260 may be configured to predict various results that may occur in regards to a vortex formed by air flowing though the upper chamber 103, such as the vortex 320 depicted in FIGS. 3 and 4. As such, the controller 260 may be able to predict a relationship between various properties of the fume hood system indicative of volumetric air flow, such as the sash position 504, the pressure differential 508, and the speed at which the fan 113 rotates (thereby drawing air through the upper chamber 103). Such predictive measures can be configured for the other inputs as shown. For example, the sash position 504 may be indicative of a potential face velocity traveling into the upper housing 103, and various predictive correlations may be outlined with respect to the remaining inputs of the flow 500, including the current baffle geometry 503 and the pressure differential 508. Similar predictive outlines may be configured for the pressure differential 508. In this sense, the controller 260 may be prepared to make dynamic adjustments to the system within the upper housing 103 regardless of the particular order or priorities at which the various inputs arrive. To illustrate, the controller 260 may first determine the current baffle geometry 503 (via the received measurements from the first baffle actuator 311 and the second actuator 312), outline a predictive tree for interpretations of the remaining inputs (the sash position 504 and the pressure differential 508), determine the sash position 504, and re-outline the predictive tree for the oncoming determination of the pressure differential 508. If, at any point in the process of outlining such predictive determinations, the controller 260 makes a determination that no ensuing measures may be made to adjust the system within upper housing 103 to maintain appropriate conditions, the controller 260 may short-circuit the flow 500 to provide a status and/or warning message 514 to the user display 240 without further processing. In this sense, the controller 260 may be configured to alert a user of an inappropriate condition at the earlies point possible, depending on the various timings of arriving inputs.

In some embodiments, once the controller 260 has received or determined the current baffle geometry 503, the sash position 504, and the pressure differential 508, the controller 260 may apply one or more processing circuits and memories to determine the adjusted baffle geometry 513, the exhaust valve position 505, and a status and/or warning message 514. Additionally, or as part of the determining the aforementioned outputs, the controller 260 may determine an overall state of containment within the upper housing 103. The adjusted baffle geometry 513 and the exhaust valve position 505 may be determined to optimize the various properties of the airflow within the upper chamber 103. For example, the adjusted baffle geometry 513 and the exhaust valve position 505 may be calculated to ensure that the vortex 320 is articulated in a robust manner that is unlikely to be interrupted by dynamic changes to the operating environment within the upper housing 103. In some embodiments, the adjusted baffle geometry 513 is partitioned into an updated upper baffle position 511 to be provided to the first baffle actuator 311 and a lower baffle position 512 to be provided to the second actuator 312. In other embodiments, and as suggested above, a generalized adjusted baffle geometry 513 may not be determined and the two separate determinations of updated baffle positions are immediately passed to the respective actuators. The status and/or warning message 514 may be displayed to a user via the user display 240 to indicate various operating parameters of the fume hood 101 including, but not limited, to, the interior pressure measurement 506, the exterior pressure measurement 507 and a face velocity. Further, the status and/or warning message 514 may communicate to the user a warning message identifying that containment is nearing in appropriate conditions or an alert that containment is in inappropriate condition. In some embodiments, the user display 240 may provide a warning message or alert message until the various dynamic updates described herein result in more appropriate (e.g., contained) conditions.

Referring specifically to FIG. 5B, the flow 500 is shown according to another embodiment. As shown, the exhaust valve position is received/determined by the controller 260 as an input rather than an output for determining updates to the system within the upper housing 103.

In some embodiments, the sash position sensor 230 may be coupled to an exhaust valve actuator 550, and the exhaust valve actuator 550 may be coupled to the exhaust valve 111. The exhaust valve actuator 550 may operate to move the exhaust valve 111 between various rotational positions between open and closed (e.g., between a position where air is freely traveling through the exhaust valve 111 and a position where air is completely blocked by the exhaust valve 111) to an exhaust valve position 505, and may further operate to determine a current rotational position of the exhaust valve 111. The exhaust valve actuator 550 may operate similar to the first baffle actuator 311 as described above with reference to FIG. 4, or the exhaust valve actuator 550 may be a standard solenoid valve with a coupled sensor. As described above with reference to FIG. 1, the fan 113 creates a negative pressure in the ductwork 110. Accordingly, air flows out the upper housing 103, into the ductwork 110, and through the exhaust valve 111. In some embodiments, the fan 113 operates to create a constant negative pressure, and operation of an actuator, such as an exhaust valve actuator 550 described with reference to FIGS. 5A and 5B (thereby moving the exhaust valve 111 between various rotational positions) acts to control the volume of air being drawn from the fume hood 103.

In some arrangements, and as shown, the exhaust valve actuator 550 receives the sash position 504 from the sash position sensor 230 and controls the exhaust valve 111 independently of the controller 260. As suggested above, in a VAV system, the position of the sash is monitored, and the volumetric flow rate of air being drawn through the fume hood is adjusted in response. In cases where it is desirable ensure that the fume hood achieves appropriate containment primarily through achieving a target face velocity (e.g., 100 FPM), such an arrangement may be beneficial, as the exhaust valve 111 may be open or closed directly responsive to opening or closing of the sash 104. Thus, by calibrating the fan 113 to operate at a sufficient speed, the exhaust valve actuator may operate in direct communication with the sash position sensor 230 to move towards an open position in response to the sash 104 being raised (in order to increase face velocity through the opening 109) and move towards a closed position in response to the sash 104 being lowered (in order to decrease face velocity through the opening 109), thereby maintaining a consistent face velocity that meets operational requirements. However, in other arrangements, the exhaust valve actuator 550 is controlled by the controller 260 as described with reference to FIG. 5A above.

Figure 6:
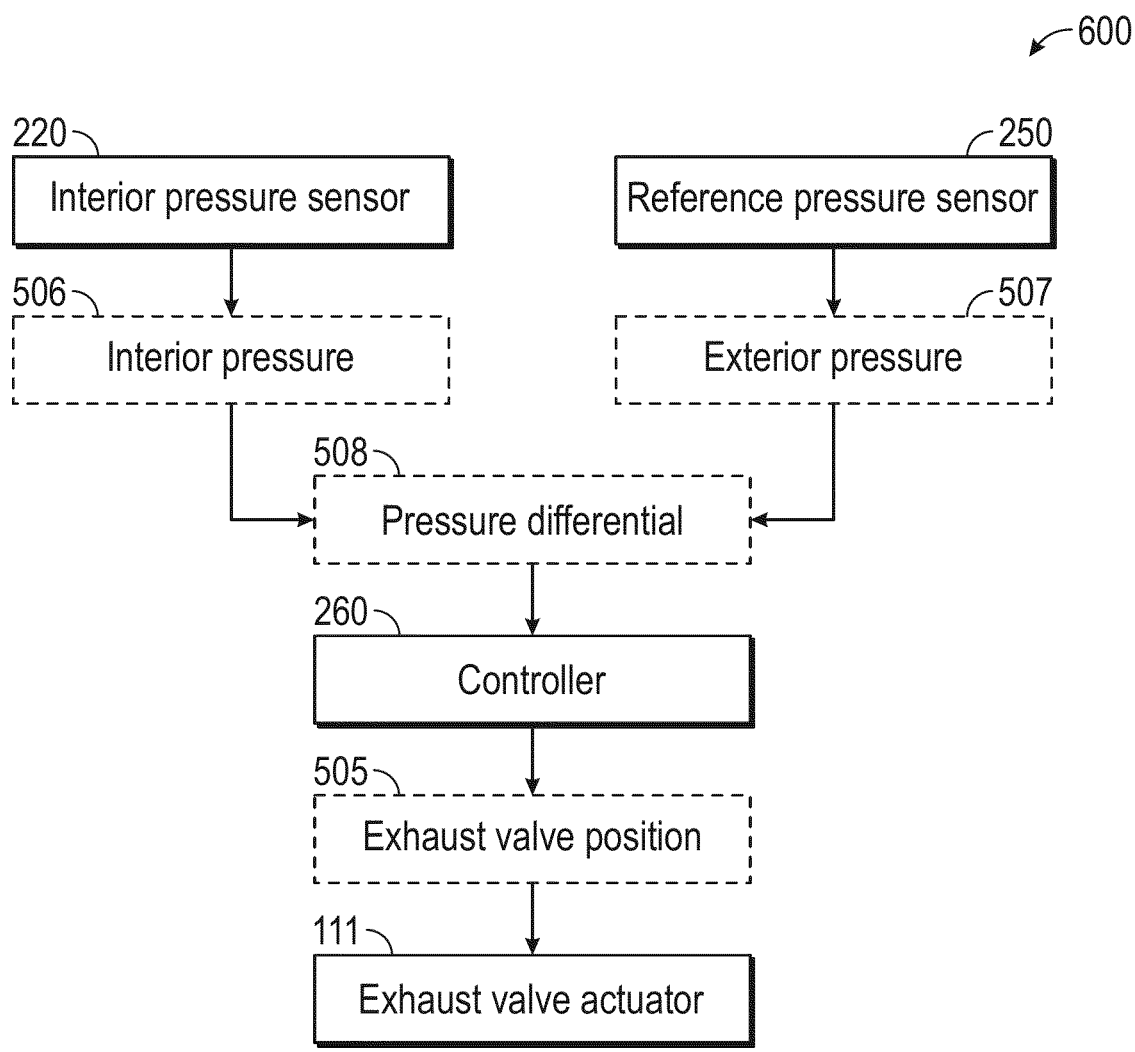
FIG. 6 is a flow diagram showing a controller controlling the position of an exhaust valve of a fume hood, according to one embodiment.
Figure 7:
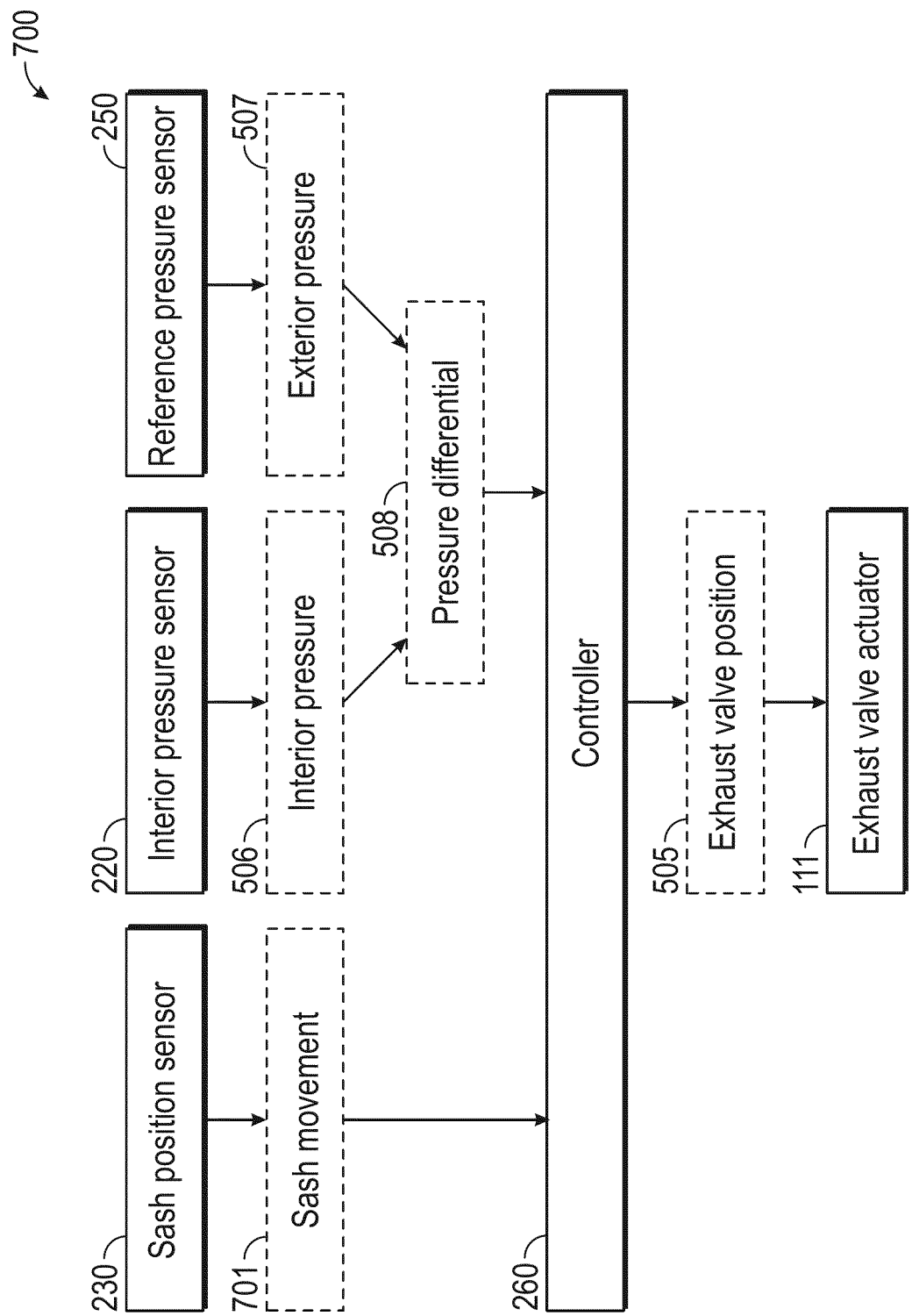
FIG. 7 is a flow diagram showing a controller controlling the position of an exhaust valve of a fume hood, according to one embodiment.

Referring now to FIGS. 6 and 7, with additional reference to FIGS. 1, 2, 4, 5A, and 5B a flow 600 for maintaining negative pressure within a fume hood, such as the fume hood 101 is shown, according to some embodiments. In some embodiments, the first pressure sensor 220 determines the air pressure within the upper housing 103 and provides an interior pressure measurement 506. Similarly, the second pressure sensor 250 determines the air pressure in the room 102 and provides an exterior pressure measurement 507. A pressure differential 508 may be determined by comparing the interior pressure measurement 506 and the exterior pressure measurement 507. Thus, the pressure differential 508 may be determined by, or provided to, the controller 260. In other embodiments, and as described above with reference to FIG. 2, a single differential pressure sensor may provide the controller 260 with a single differential pressure measurement that indicates the pressure differential 508.

In some embodiments, the sash position sensor 230 provides a sash movement 701 (e.g., change in position, speed, velocity, etc.), as shown in FIG. 7 in particular.

In some embodiments, once the controller 260 has received or determined the pressure differential 508, the controller 260 may apply one or more processing circuits and memories to determine the exhaust valve position 505 and control the exhaust valve actuator 111 to achieve the exhaust valve position 505. In other embodiments, once the controller 260 has received or determined the pressure differential 508 and the sash movement 701, the controller 260 may apply one or more processing circuits and memories to determine the exhaust valve position 505 and control the exhaust valve actuator 111 to achieve the exhaust valve position 505. In some embodiments, the controller 206 may determine the exhaust valve position 505 through the use of a control loop, as described in greater detail below with reference to FIGS. 8 and 9. In other embodiments, the controller 260 may determine the exhaust valve position 505 through the use of a method (alone or in conjunction with a control loop) that discriminates between determining the exhaust valve position 505 based on the pressure differential 508 and determining the exhaust valve position 505 based on the sash movement 701. Such a method is described in greater detail below with reference to FIG. 10. Additionally, or as part of the determining the aforementioned outputs, the controller 260 may determine an overall state of containment within the upper housing 103.

In some embodiments, the exhaust valve position 505 may be determined to maintain a desired negative pressure (e.g., the interior pressure measurement 506 subtracted from the exterior pressure measurement 507) within the upper chamber 103. The desired negative pressure may be a "setpoint" negative pressure determined to result in containment of air particles (and accordingly maintenance of the stable vortex, in some cases) within the upper housing 103. In some embodiments, the setpoint negative pressure is −0.01 water column (e.g., inches of water). However, the setpoint negative pressure may be any value determined to result in containment of air particles. For example, variations in the particular dimensions and configurations of a particular fume hood may alter the particular setpoint negative pressure associated with containment of air particles/maintenance of the stable vortex. Such a setpoint negative pressure may be stored in a memory of the controller 260 or provided by a separate device, such as a management device.

Figure 8:
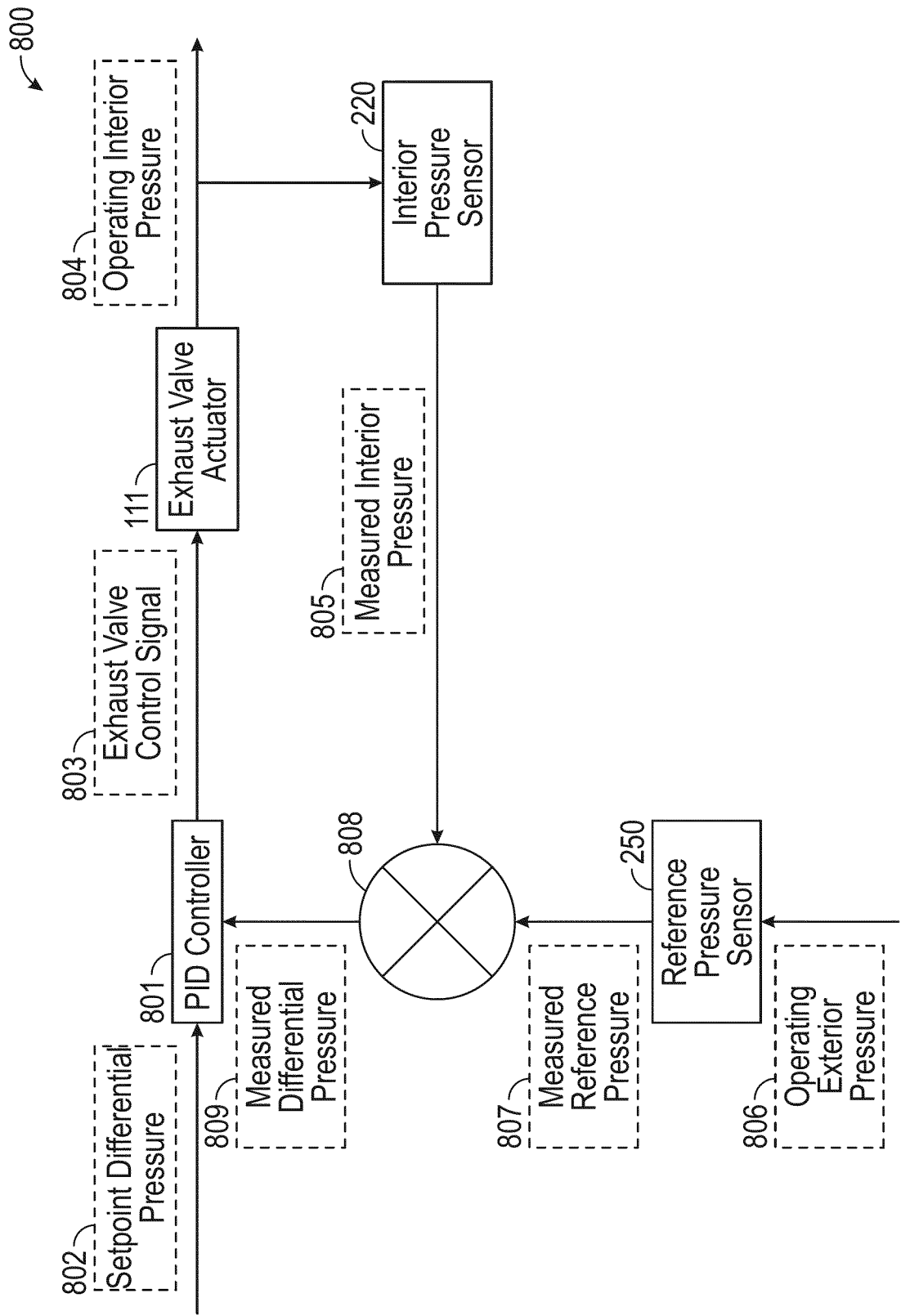
FIG. 8 is a control loop for controlling the position of an exhaust valve in a fume hood, according to one embodiment.
Figure 9:
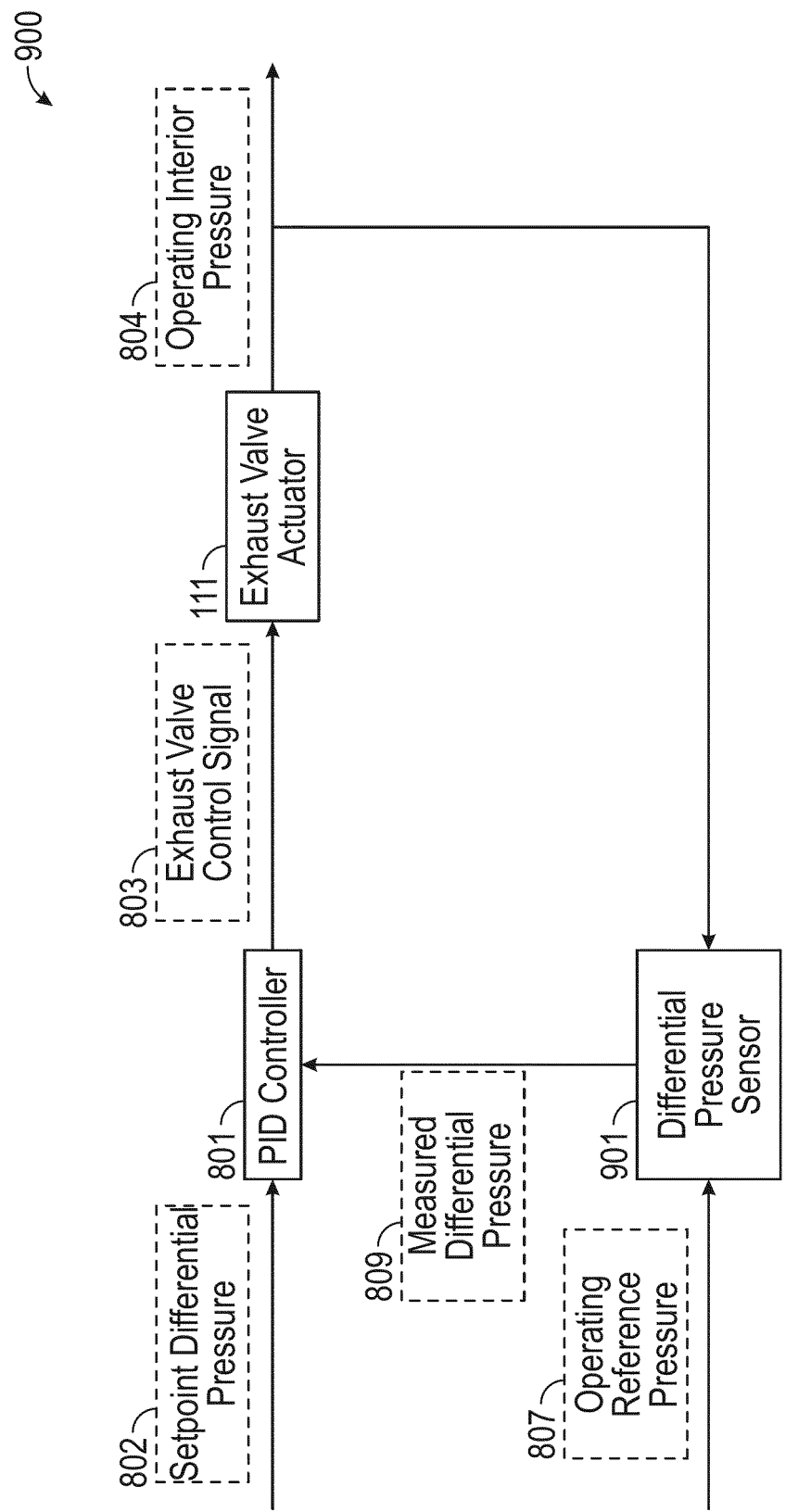
FIG. 9 is a control loop for controlling the position of an exhaust valve in a fume hood, according to one embodiment.

Referring now to FIG. 8, with additional reference to FIGS. 1, 2, 4, 5A, 5B, and 7, a control loop 800 (e.g., a feedback loop) is shown, according to some embodiments. The control loop 800 may include a controller 260, the exhaust valve actuator 111, the first pressure sensor 220, the second pressure sensor 250, and an aggregator 808. In some embodiments, the controller 260 is a proportional-integral-derivative (PID) controller or any other feedback controller configured to perform the systems and methods described herein. The controller 260 may be configured to receive a measured differential pressure 809 and a setpoint differential pressure 802, and output the exhaust valve position 505. In some embodiments, the exhaust valve position 505 may be transmitted as an exhaust valve control signal, as depicted in FIG. 9 below. As suggested above, in some embodiments, the setpoint differential pressure 802 is provided by a management device. In other embodiments, the controller 260 is configured to determine the setpoint differential pressure 802, which may be stored in a memory of the controller 260. The exhaust valve position 505 may be received by the exhaust valve actuator 111. In response to receiving the exhaust valve position 505, the position of the exhaust valve actuator 111 may be adjusted such that more or less air is drawn through the upper housing 103, such that an operating interior pressure 804 (e.g., actual interior pressure, unmeasured interior pressure, process interior pressure, etc.) within the upper housing 103 is changed. The operating interior pressure 804 may be measured by the first pressure sensor 220 to gather a measured interior pressure 805. The first pressure sensor 220 may then transmit the measured interior pressure 805 to the aggregator 808. The aggregator 808 may additionally receive a measured reference pressure 807 from the reference pressure sensor 205. The aggregator 808 may be configured to determine a difference between the measured interior pressure 805 and the measured reference pressure 807 (e.g., by subtracting the measured interior pressure 805 from the measured reference pressure 807) in order to output a measured differential pressure 809. The aggregator 808 may provide the measured differential pressure 809 to the controller 260. While shown as different components, in some embodiments, the aggregator 808 is included in the controller 260.

As suggested above, the controller 260 may be configured to receive the measured differential pressure 809 and the setpoint differential pressure 802 and output the exhaust valve position 505. In some embodiments, the controller 260 is configured to determine a difference between the setpoint differential pressure 802 and the measured differential pressure 809. Such a determination may be done incrementally. For example, the determination may be implemented by continuously receiving the measured differential pressure 809 and continuously outputting the updated exhaust valve position 505. In other arrangements, the determination is made at specific intervals (e.g., once every 0.1 seconds, 0.5 seconds, 1 second, etc.). As such, the controller 260 may be configured to adjust the output of the exhaust valve position 505 in order to decrease a determined difference between the setpoint differential pressure 802 and the measured differential pressure 809. Decreasing the difference between the setpoint differential pressure 802 and the measured differential pressure 809 may have multiple benefits for the function and operation of the fume hood 101. For example, as suggested above, the setpoint differential pressure 802 may be a differential pressure associated with maintaining containment of air particles within the upper housing 103 in order to achieve appropriate fume hood operations. Accordingly, in some embodiments, where the setpoint differential pressure 802 is −0.01 water column, and the measured differential pressure 809 is greater than the setpoint differential pressure 802 (e.g., the measured differential pressure 809 is 0.01 water column compared to the setpoint differential pressure 802 of −0.01 water column, in some cases), the controller 260 may be configured to operate the exhaust valve controller 111 (via the exhaust valve control signal 803) to decrease the measured differential pressure 809 until the measured differential pressure 809 substantially matches the setpoint differential pressure 802. To this extent, the controller 260 may be advantageously maintaining containment of air particles within the upper housing 103 (and maintaining the stable vortex, in some cases).

Conversely, in some embodiments, where the setpoint differential pressure 802 is less than the measured differential pressure 809, the controller 260 may be configured to operate the exhaust valve controller 111 (via the exhaust valve control signal 803) to increase the measured differential pressure 809 until the measured differential pressure 809 substantially matches the setpoint differential pressure 802. To this extent, the controller 260 may be advantageously improving the energy efficiency of the ventilation system 100. For example, in some arrangements, the controller 260 could be configured to operate the exhaust valve controller 111 to decrease the measured differential pressure 809 to be substantially less than the setpoint differential pressure 802. Here, the operating interior pressure 804 would still achieve the desired quality of containment of air particles. However, as the operating interior pressure 804 decreases to lower values, more air is accordingly drawn through the upper housing 103, thus requiring more energy from a power source associated with the ventilation system 100. In some embodiments, a particular setpoint differential pressure 802 is considered sufficient for achieving the desired quality of containment of air particles, therefore any additional air drawn through the upper housing 103 may be considered wasted power in the ventilation system 100 and thus lower energy efficiency. By adjusting the output of the exhaust valve control signal 803 in order to decrease the determined difference between the setpoint differential pressure 802 and the measured differential pressure 809 (regardless of whether the measured differential pressure 809 should be increased or decreased by such adjustments), both advantages (air particle containment and power efficiency) may be substantially achieved.

Referring now to FIG. 9 with additional reference to FIGS. 1, 2, 4, 5A, 5B, and 8, a control loop 900 is shown, according to some embodiments. In some embodiments, the control loop 900 operates substantially similar to the control loop 800. However, as shown, the first pressure sensor 220, second pressure sensor 250, and the aggregator 808 of the control loop 800 may be replaced by a differential pressure sensor 901. In this sense, the differential pressure sensor 901 may be configured to measure two input conditions (the operating interior pressure 804 and the operating exterior pressure 806) in order to output the measured differential pressure 809. Additionally, as suggested above, the exhaust valve position 505 depicted in FIG. 8 is represented as an exhaust valve control signal 803.

Figure 10:
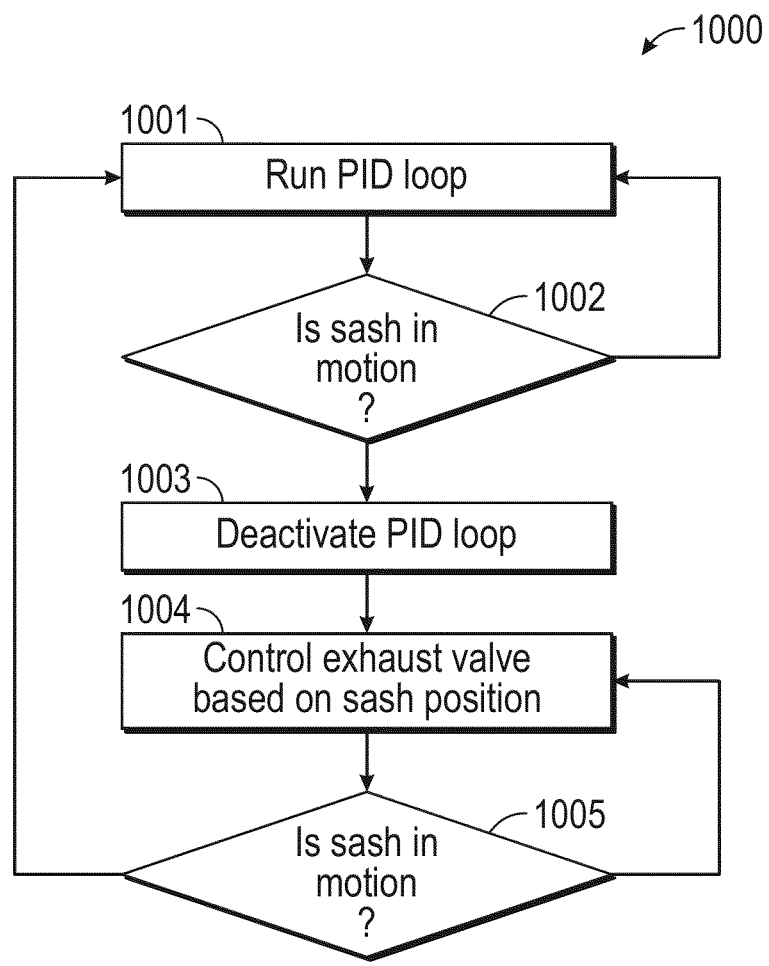
FIG. 10 is a flow for identifying a particular method of controlling the position of an exhaust valve in a fume hood, according to one embodiment.

Referring now to FIG. 10 with additional reference to FIGS. 1, 2, 4, 5A, 5B, 7, 8, and 9, a flow 1000 for selective control schemes of the exhaust valve actuator 111 is shown, according to some embodiments. In some embodiments, the flow 1000 may be implemented by the controller 260. In other embodiments, the flow 1000 may be implemented by incorporating additional controllers and/or computing devices. Referring back to FIG. 7, the controller 260 may receive both the sash movement 701 as input and the pressure differential 508 as input. In some embodiments, the controller 260 may receive both inputs, but selectively operate the exhaust valve actuator 111 in response to (e.g., based on) only one of the measurements. In some embodiments, by incorporating the flow 1000, the controller 260 may "override" controlling the exhaust valve actuator 111 based on the measured differential pressure 809 (as substantially depicted by FIGS. 8 and 9), instead controlling the exhaust valve actuator 111 based on a sash position. In some embodiments, the sash position may be determinable based on the sash movement 701 input. In other embodiments, the sash position sensor may provide a sash position measurement in addition to, or as an alternative to, the sash movement 701 input.

In some embodiments, at a step 1001, the PID loop is run. As suggested above, while shown as a "PID loop," at step 1001, any control loop may be performed that is configured according to the structures and methods provided herein, particularly according to the structures and methods defined by the control loop 800 depicted in FIG. 8 and/or the control loop 900 depicted in FIG. 9. Accordingly, in some embodiments, either of the control loop 800 or the control loop 900 may be performed.

At step 1002, a decision may be performed to determine whether the sash 104 is in motion. Such a determination may be made by the sash position sensor 230, as suggested above. If the sash 104 is in motion, the flow 1000 proceeds to a step 1003. If the sash 104 is not in motion, the flow 1000 returns to, or continues to, run the PID loop in the step 1001. At the step 1003 the PID loop may be deactivated. For example, the exhaust valve actuator 111 may no longer be controlled by the controller 206 based on the difference between the measured differential pressure 809 and the setpoint differential pressure 802. It should be appreciated that to facilitate the structures and methods provided herein, the measurements themselves (e.g., the measured differential pressure 809) may continue to be received by the controller 260, but rather the controller 260 will not control the exhaust valve actuator 111 based on such measurements. Instead, the flow 1000 may proceed to a step 1004, where the exhaust valve actuator 111 is controlled based on a position of the sash 104. For example, while the sash 104 is in motion, the sash 104 may move to a position that enlarges the opening 109, such that more air is able to travel through the opening 109 into the upper housing 103, thereby increasing the interior pressure within the upper housing 103. As another example, while the sash 104 is in motion, the sash 104 may move to a position that recedes the opening 109, such that less air is able to travel through the opening 109 into the upper housing 103, thereby decreasing the interior pressure within the upper housing 103. Such changes may happen quickly, depending on the speed at which the sash 104 is moved. In some embodiments, a control loop such as the control loop 800 and/or the control loop 900 may not be best suited to quickly adjust the exhaust valve actuator 111 in order to maintain fume hood operations as described herein. For example, the control loop 800 and/or the control loop 900 may be better configured to make smaller incremental changes via continuous adjustments to the exhaust valve actuator 111 based on the measured differential pressure 809. Accordingly, in some embodiments, it may be advantageous to include a method of quickly updating the exhaust valve actuator 111 in response to changes in the position of the sash 104.

Therefore, in some embodiments, the exhaust valve actuator 111 may be automatically controlled to allow for more air to be drawn from the upper housing 103 to counteract the additional pressure and maintain an interior pressure of the upper housing 103 such that the pressure differential 508 (e.g., a negative pressure differential) is generated to maintain appropriate fume hood operations (e.g., containment of air particles, maintenance of the stable vortex, etc.). In this sense, substantial changes in the interior pressure measurement 506 of the upper housing 103 may be quickly reacted to by automatically operating the exhaust valve actuator 111 to react to the position of the sash 104, rather than making finer adjustments via a control loop, such as the control loop 800 or the control loop 900.

In some embodiments, at a step 1005, a decision is performed to determine whether the sash 104 is in motion, similar to the step 1002. If the sash 104 is still in motion, the step 1004 is repeated, thereby continuing to control the exhaust valve actuator 111 based on the position of the sash 104. However, if the sash 104 is no longer in motion, the flow 1000 returns to the step 1001 to continue running the PID loop (which may further include a separate step of activating the PID loop, according to some implementations). In some embodiments, a timer may be activated when, at the step 1005, it is determined that the sash 104 is not in motion. After a threshold period of time elapses, the flow 1000 may return to the step 1001 as described above. In this sense, the various switches between controlling the exhaust valve actuator 111 based on the position of the sash 104 and controlling the exhaust valve actuator 111 based on the measured differential pressure 809 may be "buffered" to account for granular detections of a "stop" and "start" regarding the motion of the sash 104 that do not otherwise practically relate to the sash 104 no longer being in motion.

It should be noted that the flow 500 shown in FIGS. 5A and 5B, the flow 600, the flow 700, the control loop 800, the control loop 900, and the flow 1000 may include any of the features discussed with respect to the other embodiments disclosed elsewhere herein, including the use of a single baffle, multiple exhaust valves, multiple interior pressure sensors, multiple reference pressure sensors, differing types of sensors, actuators, etc. Similarly, any of the features of FIGS. 5A, 5B, 6, 7, 8, 9, and 10 may be incorporated into the other embodiments disclosed herein. All such combinations of features are to be understood to be within the scope of the present disclosure.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the upper baffle 301, shown as positioned in FIG. 4, may be incorporated in the fume hood that includes the lower baffle 302, shown as positioned in FIG. 3. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fume hood control system for a fume hood comprising a sash, a hood enclosure positioned within an environment and comprising a plurality of sidewalls forming a work chamber, a first aperture configured to permit an airflow between the environment and the work chamber, a second aperture configured to permit the airflow between the work chamber and an outlet, and an exhaust valve disposed in the outlet, the exhaust valve transitionable between a plurality of positions, the sash being configured to at least partially cover the first aperture, the fume hood control system comprising:
   a controller configured to:
      determine a differential pressure measurement;
      determine a current position of the exhaust valve;
      determine a position of the sash; and
      control the operation of the exhaust valve to selectively transition between the current position of the exhaust valve and an updated position of the exhaust valve based on at least one of: (1) a difference between a setpoint differential pressure value and the differential pressure measurement and (2) the position of the sash, wherein when the controller is controlling the operation of the exhaust valve based on the position of the sash, the controller is not controlling the operation of the exhaust valve based on the difference between the setpoint differential pressure value and the differential pressure measurement; and when the controller is controlling the operation of the exhaust valve based on the difference between the setpoint differential pressure value and the differential pressure measurement, the controller is not controlling the operation of the exhaust valve based on the position of the sash.

2. The system of claim 1, wherein the differential pressure measurement is based on a difference between a first air pressure outside the enclosure and a second air pressure within the hood enclosure.

3. The system of claim 2, wherein the first air pressure is determined by a first pressure sensor and the second air pressure is determined by a second pressure sensor.

4. The system of claim 1, wherein the setpoint differential pressure value is −0.01 water column.

5. The system of claim 1, wherein the operation of the exhaust valve is configured to decrease the difference between the setpoint pressure differential and the differential pressure measurement.

6. The system of claim 1, wherein the exhaust valve is coupled to one or more fans operable to draw the airflow from the environment, through the work chamber, and through the exhaust valve, such that transitioning the exhaust valve between the current position and the updated position results in one of an increase or a decrease in a volume of the airflow over a period of time.

7. The system of claim 1, wherein controlling the operation of the exhaust valve adjusts the airflow such that the airflow is operable to contain a plurality of air particles within the work chamber.

8. The system of claim 7, wherein the fume hood further comprises a baffle configured to direct a path of the airflow within the work chamber such that controlling the operation of the exhaust valve further adjusts the airflow to form a stable vortex.

9. The system of claim 1, wherein the controller is further configured to control the operation of the exhaust valve based on the position of the sash in response to an identification of a change in the position of the sash.

10. A method of controlling an exhaust valve of a fume hood, the method comprising:

determining, via a controller, a current position of an exhaust valve, the exhaust valve transitionable between a plurality of positions;

controlling, via the controller, the exhaust valve to transition between the current position of the exhaust valve and an updated position of the exhaust valve based on a position of a sash when a position sensor determines that the position of the sash is changing; and controlling, via the controller, the exhaust valve to transition between the current position of the exhaust valve and the updated position of the exhaust valve based on a difference between a differential pressure measurement and a setpoint differential pressure value when the position sensor determines that the position of the sash is not changing, wherein the differential pressure measurement is based on a first pressure measurement of an air pressure within the fume hood and a second pressure measurement of an air pressure outside the fume hood.

11. The method of claim 10, wherein controlling the exhaust valve adjusts an airflow within the fume hood such that the airflow is operable to contain a plurality of air particles within the fume hood.

12. The method of claim 11, wherein controlling the exhaust valve further adjusts the airflow to form a stable vortex.

13. The method of claim 10, wherein controlling the exhaust valve based on the difference between the differential pressure measurement and the setpoint differential pressure decreases the difference between the setpoint differential pressure and the differential pressure measurement.

14. A controller for controlling a position of an exhaust valve in a fume hood system comprising a pressure sensor and an actuator, the controller comprising:

one or more processors and a memory, the one or more processors configured to:

receive, via the pressure sensor, a pressure measurement, wherein the pressure measurement is based on a first air pressure outside the fume hood and a second air pressure within the fume hood;

receive, via a management device, a setpoint pressure;

receive, via a position sensor, a determination as to whether a sash in the fume hood system is moving; and control the actuator in response to a determination that the sash is not moving, wherein the actuator is operable to transition the exhaust valve between a current position and an updated position, and controlling the actuator is based on a difference between the setpoint pressure and the pressure measurement.

15. The controller of claim 14, wherein the one or more processors are further configured to, in response to a determination that the sash is moving, control the actuator based on a position of the sash.

16. The controller of claim 14, wherein the setpoint pressure is −0.01 water column.

17. The controller of claim 14, wherein controlling the actuator adjusts an airflow in an enclosure of the fume hood system such that the airflow is operable to contain a plurality of air particles within the enclosure.

18. The controller of claim 17, wherein the fume hood further comprises a baffle configured to direct a path of the airflow within the work chamber such that controlling the operation of the exhaust valve further adjusts the airflow to form a stable vortex.

19. The controller of claim 14, wherein the actuator is controlled to decrease the difference between the setpoint pressure and the pressure measurement, the setpoint pressure being a differential setpoint and the pressure measurement being a differential pressure measurement.

20. The controller of claim 14, wherein controlling the actuator based on the difference between the setpoint pressure and the pressure measurement further comprises controlling the actuator to decrease the difference between the setpoint pressure and the pressure measurement.

* * * * *